May 1, 1934.  E. H. LAND  1,956,867
POLARIZING BODY
Filed Jan. 16, 1933
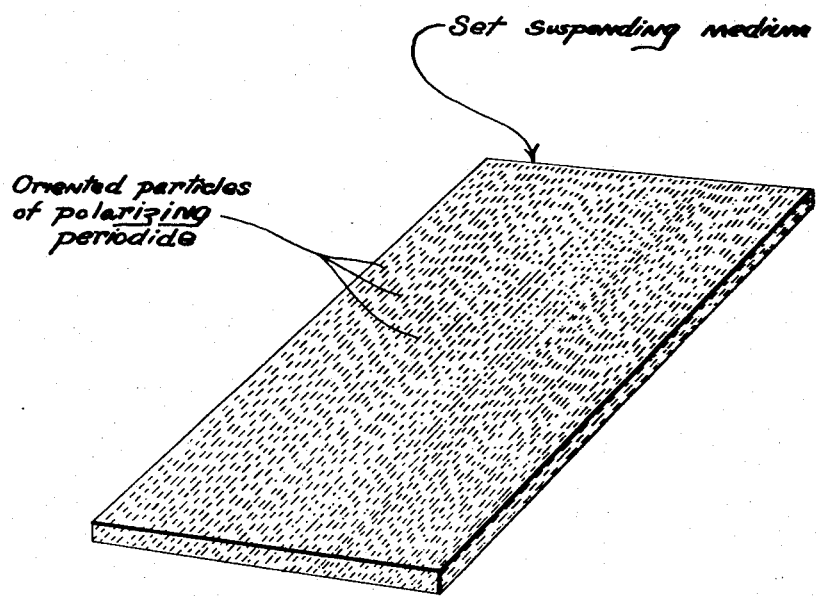
INVENTOR
Edwin Herbert Land
BY
Warfield & Brown
ATTORNEYS Patented May 1, 1934

1,956,867

UNITED STATES PATENT OFFICE 1,956,867

POLARIZING BODY

Edwin H. Land, Wellesley Farms, Mass.

Application January 16, 1933, Serial No. 651,953

15 Claims. (Cl. 88—14)

This invention relates to polarizing bodies, and particularly to polarizing bodies comprising a transparent suspending medium having dispersed therein polarizing particles of an acid periodide.

The invention has for its object generally an improved polarizing body adapted when interposed in a beam of light to transmit one of the resolved components of the beam only, without visible color change and with a minimum of absorption.

A further object of the invention is to provide a polarizing body comprising a set suspending medium through which is dispersed a mass of oriented transparent colorless inorganic polarizing particles.

A further object of the invention is to provide an improved polarizing body comprising a set suspending medium with a mass of particles of purpureocobaltchloridesulfateperiodide distributed therein with their polarizing axes arranged in substantial parallelism.

Other objects of the invention will in part be obvious and will in part appear hereinafter.

The invention accordingly comprises a product possessing the features, properties, and the relation of components which will be exemplified in the product hereinafter described and the scope of the application of which will be indicated in the claims.

For a fuller understanding of the nature and objects of the invention, reference should be had to the following detailed description taken in connection with the accompanying drawing, which shows in a greatly magnified scale a diagrammatic representation of a polarizing body embodying the invention. It will be understood that the oriented particles of a polarizing periodide illustrated in the accompanying drawing are preferably actually of such size and transparency as to be invisible even under a standard low-power mircroscope.

In my copending application Serial No. 434,833, filed March 10, 1930, I disclose a process of manufacturing polarizing bodies comprising a suitable suspending medium in which a mass of colloidal herapathite or similar substance is dispersed, and I have described a method whereby the suspending medium containing the dispersed colloid may be subjected to a field of force to orient the colloidal particles so as to cause their polarizing axes to align in substantial parallelism. The medium is then hardened or set and an improved polarizing body produced.

Herapathite polarizes more efficiently the light of the wave-lengths of the middle of the visible spectrum and is less efficient in polarizing light of the wave-lengths at either end of the visible spectrum. As a result, polarizing bodies made by the process of my said copending application tend to effect a color change of the transmitted light unless a relatively high concentration of herapathite particles is interposed in the path of the beam.

This invention has for its object the production of a polarizing body which transmits polarized light without color change, even where the discrete particles within the polarizing body are present in low concentration.

It has been found that a considerable number of the periodides, and particularly of the acid periodides, may be utilized with distinct advantage in the formation of improved polarizing bodies. These polarizing bodies may comprise a suitable set suspending medium in which is distributed a mass of relatively small and, preferably, colloidal particles of polarizing periodides with their polarizing axes aligned in substantial parallelism. The periodides used may be either organic or inorganic. As an example of the organic group, herapathite is typical and is representative of a group comprising the periodides of the sulphates of quinidine, cinchonine and cinchonidine. The periodide of the sulphate of toluidin is also an admirable polarizer and may be adaptable with a suitable suspending medium to form polarizing bodies of the type here referred to.

As an example of the group of inorganic polarizing periodides, purpureocobaltchloridesulfateperiodide has been found admirably adapted for use with a suitable suspending medium to form a polarizing body of the type here referred to.

Minute particles of this substance, particles having a thickness not exceeding 0.00002 inches, for example, have been found to give complete polarization of a transmitted beam and such particles when superimposed with their polarizing axes at right angles are found to give complete extinction. The transmitted beam is furthermore colorless and remains colorless, even though a great many similar particles with their polarizing axes parallel may be superimposed one on the other in the path of the beam. Furthermore, particles of this substance transmit polarized light with only an extremely slight loss. Particles of purpureocobaltchloridesulfateperiodide may be suitably dispersed through suspending media comprising cellulose nitrate or cellulose acetate in the manner outlined in my copending application Serial No. 434,833.

The polarizing particles, preferably in colloidal form, may, for example, be introduced into a mixture of cellulose acetate and most solvents therefor, such as methyl acetate.

The use of an inorganic polarizing substance in a suitable suspending medium has certain marked advantages. For example, most of the organic solvents may be used with the inorganic polarizing material without dissolving it. Specifically, purpureocobaltchloridesulfateperiodide may be incorporated in a suspending medium comprising nitrocellulose while still wet with alcohol, whereas in the case of an organic polarizing periodide such as herapathite, the alcohol must be removed.

It is within the scope of my invention to incorporate particles of any polarizing periodide, whether organic or inorganic, in a suitable suspending medium, to disperse said particles throughout the medium, and to subject the particles to a field of force to which they are susceptible to orient their polarizing axes and then to set or harden the medium to form a polarizing body.

It is to be understood that while colloidal particles are preferred, it is within the scope of my invention to use larger particles of the polarizing periodide. By colloidal particles is meant particles having one dimension, at least, shorter than the wave-lengths of the light used with the polarizer.

By a set or hardened suspending medium is meant a suspending medium of such viscosity, at least, that the oriented polarizing particles therein are retained in their position of orientation.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim and desire to secure by Letters Patent is:

1. A polarizing body comprising a set suspending medium and a mass of particles of a polarizing periodide dispersed and immovably embedded therein with their polarizing axes oriented in substantial parallelism, said body being adapted to retain its polarizing properties independent of external support.

2. A polarizing body comprising a set suspending medium and a mass of colloidal particles of a polarizing periodide dispersed and immovably embedded therein with their polarizing axes oriented in substantial parallelism, said body being adapted to retain its polarizing properties independent of external support.

3. A polarizing body comprising a set suspending medium and a mass of particles of an inorganic polarizing periodide dispersed and immovably embedded therein with their polarizing axes oriented in substantial parallelism, said body being adapted to retain its polarizing properties independent of external support.

4. A polarizing body comprising a set suspending medium and a mass of colloidal particles of an inorganic polarizing periodide dispersed and immovably embedded therein with their polarizing axes oriented in substantial parallelism, said body being adapted to retain its polarizing properties independent of external support.

5. A polarizing body comprising a set suspending medium and a mass of particles of purpureocobaltchloridesulfateperiodide dispersed and immovably embedded therein with their polarizing axes oriented in substantial parallelism.

6. A polarizing body comprising a set suspending medium and a mass of colloidal particles of purpureocobaltchloridesulfateperiodide dispersed and immovably embedded therein with their polarizing axes oriented in substantial parallelism.

7. A polarizing body comprising a mass of particles of a polarizing periodide dispersed and immovably embedded throughout a suspending medium comprising a cellulose compound, said particles having their polarizing axes oriented to substantial parallelism, said body being adapted to retain its polarizing properties independent of external support.

8. A polarizing body comprising a set suspending medium comprising cellulose acetate having dispersed therethrough and immovably embedded therein a mass of colloidal particles of a polarizing periodide, said body being adapted to retain its polarizing properties independent of external support.

9. A polarizing body comprising a set suspending medium comprising cellulose acetate having dispersed therethrough and immovably embedded therein a mass of colloidal particles of a polarizing acid periodide, said body being adapted to retain its polarizing properties independent of external support.

10. A polarizing body comprising a set suspending medium comprising cellulose acetate having dispersed therethrough and immovably embedded therein a mass of colloidal particles of a polarizing inorganic acid periodide, said body being adapted to retain its polarizing properties independent of external support.

11. A polarizing body comprising a set suspending medium comprising cellulose acetate having dispersed therethrough and immovably embedded therein a mass of colloidal particles of purpureocobaltchloridesulfateperiodide.

12. A transparent polarizing body comprising a set suspending medium having dispersed therethrough and immovably embedded therein transparent colorless particles of a polarizing periodide with their polarizing axes oriented in substantial parallelism, said polarizing body being adapted to transmit polarized light without color change and being adapted to retain its polarizing properties independent of external support.

13. A transparent polarizing body comprising a set suspending medium having dispersed and immovably embedded therein transparent colorless particles of a polarizing periodide with their polarizing axes oriented in substantial parallelism, said polarizing body being adapted to transmit polarized light without appreciable loss and being adapted to retain its polarizing properties independent of external support.

14. A polarizing body comprising a set suspending medium having dispersed and immovably embedded therein polarizing particles of a salt containing iodin with their polarizing axes oriented in substantial parallelism, said body being adapted to retain its polarizing properties independent of external support.

15. A polarizing body comprising a set suspending medium having dispersed and immovably embedded therein colloidal polarizing particles of a salt containing iodin with their polarizing axes oriented in substantial parallelism, said body being adapted to retain its polarizing properties independent of external support.

EDWIN H. LAND.